(12) United States Patent
Ronca et al.

(10) Patent No.: US 9,398,301 B2
(45) Date of Patent: Jul. 19, 2016

(54) PARALLEL VIDEO ENCODING BASED ON COMPLEXITY ANALYSIS

(71) Applicant: NETFLIX, INC., Los Gatos, CA (US)

(72) Inventors: David R. Ronca, Campbell, CA (US); Steven Kang, Los Angeles, CA (US); Rama Kalluri, Cupertino, CA (US); Ioannis Katsavounidis, Los Angeles, CA (US)

(73) Assignee: NETFLIX, Inc., Los Altos, CA (US)

(*) Notice: Subject to any disclaimer, the term of this patent is extended or adjusted under 35 U.S.C. 154(b) by 0 days.

(21) Appl. No.: 14/484,967

(22) Filed: Sep. 12, 2014

(65) Prior Publication Data

US 2015/0071346 A1    Mar. 12, 2015

Related U.S. Application Data

(63) Continuation of application No. 12/965,593, filed on Dec. 10, 2010, now Pat. No. 8,837,601.

(51) Int. Cl.
| | | |
|---|---|---|
| *H04N 19/00* | (2014.01) | |
| *H04N 19/14* | (2014.01) | |
| *H04N 19/436* | (2014.01) | |
| *H04N 19/115* | (2014.01) | |
| *H04N 19/179* | (2014.01) | |
| *H04N 19/124* | (2014.01) | |
| *H04N 19/132* | (2014.01) | |
| *H04N 19/625* | (2014.01) | |

(52) U.S. Cl.
CPC ......... *H04N 19/14* (2014.11); *H04N 19/00521* (2013.01); *H04N 19/115* (2014.11); *H04N 19/124* (2014.11); *H04N 19/132* (2014.11); *H04N 19/179* (2014.11); *H04N 19/436* (2014.11); *H04N 19/625* (2014.11)

(58) Field of Classification Search
CPC ....................................................... H04N 19/14
USPC ..................... 375/240.16, 240.24, 240.26
See application file for complete search history.

(56) References Cited

U.S. PATENT DOCUMENTS

| | | | | |
|---|---|---|---|---|
| 2006/0222078 | A1* | 10/2006 | Raveendran | 375/240.16 |
| 2007/0002946 | A1* | 1/2007 | Bouton et al. | 375/240.01 |
| 2007/0230565 | A1* | 10/2007 | Tourapis | H04N 19/105 375/240.01 |

* cited by examiner

*Primary Examiner* — Jeffery Williams
(74) *Attorney, Agent, or Firm* — Artegis Law Group, LLP

(57) ABSTRACT

Embodiments of the invention provide techniques for encoding chunks of a video file in parallel. Embodiments may divide a source video file into a plurality of chunks, and may encode each chunk at a rate based upon complexity data associated with the chunk. The encoded chunks may then be reassembled to produce an encoded video file.

34 Claims, 8 Drawing Sheets

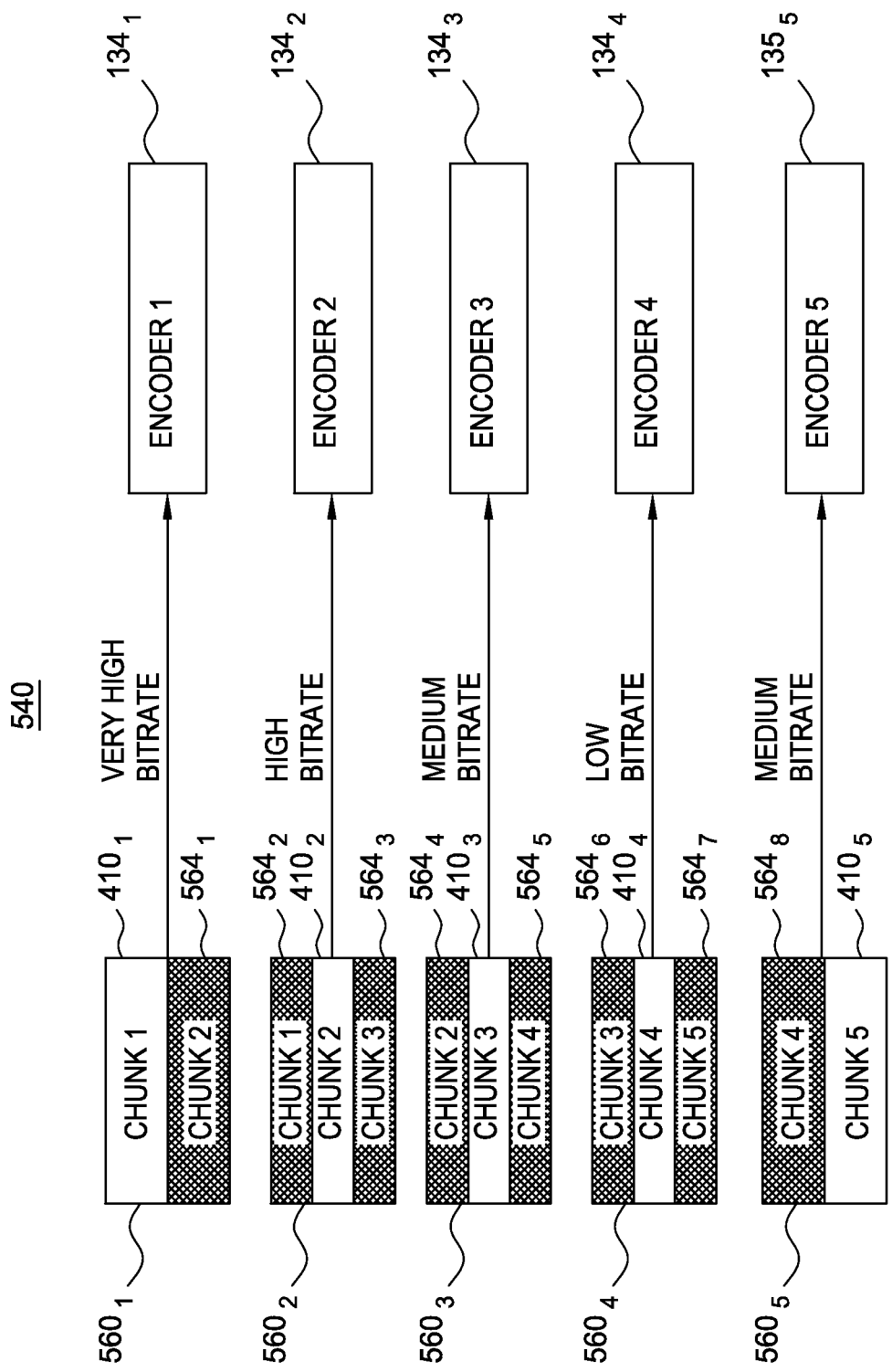

PARALLEL VIDEO ENCODING BASED ON COMPLEXITY ANALYSIS

CROSS-REFERENCE TO RELATED APPLICATIONS

This application is a continuation of co-pending U.S. patent application Ser. No. 12/965,593, filed on Dec. 10, 2010. The subject matter of this related application is hereby incorporated herein by reference.

BACKGROUND OF THE INVENTION

1. Field of Invention

Embodiments of the present invention generally relate to techniques for encoding a video file in parallel, based on a complexity analysis.

2. Description of Related Art

Digital video content is very popular today, with numerous websites and services offering various types of video content for download or streaming. Such video content ranges from movies, sports and news, to home video clips, personal video blogs and the full range of content in between. While some content is available for free, video content is often associated with some cost, with pricing plans ranging from a per-viewing charge to a monthly subscription fee. Additionally, consumer electronic devices may also be configured for streaming digital video content. For example, many personal and tablet computers, Blu-Ray players, cable boxes and even certain mobile telephone phones are capable of downloading and streaming video content today.

Typically, a content distribution system may include access servers, content servers, etc., which clients connect to using a content player, such as a gaming console, computing system, computing tablet, mobile telephone, network-aware DVD players, etc. The content server stores files (or "streams") available for download from the content server to the content player. Each stream may provide a digital version of a movie, a television program, a sporting event, user generated content, a staged or live event captured by recorded video, etc. Users may then access the service by connecting to a web server, where a list of content is available. Once a request for a particular title is received, it may be streamed to the client system over a connection to an available content server.

Because content servers often stream content to a variety of devices with different processing capabilities and display resolutions, the content servers will often store various streams of different qualities for a single video, each referred to as an encoding. However, encoding each of these different streams can take a substantial amount of time. As such, for content servers who provide streams for a substantial number of different devices, it can be difficult for content servers to quickly release streaming content within a short period of time. This is particularly problematic for limited release content, which is made available to a streaming service provider for a specified window of time.

Furthermore, although performance may be increased by encoding various portions of a source video separately and in parallel, such a solution may produce a lower quality encoding, as the individual encoders account for complexity only within a portion of the source video, rather than across the source video as a whole. For example, the most complex frames of a particular portion of the source video may be relatively simple in the context of the source video as a whole. However, because an individual encoder operating only on a portion of the source video cannot determine that, the encoder may produce a lower-quality encoding.

SUMMARY OF THE INVENTION

One embodiment of the invention includes a method for encoding, in parallel, chunks of a source video file. The method may generally include generating complexity data for the source video file. The complexity data reflects the complexity across the source video file and includes a complexity for each sampling point in a plurality of sampling points. The method may also include dividing the source video file into a plurality of chunks, wherein each chunk represents a portion of the source video file. For each chunk, a portion of a total encoding bandwidth is allocated to a chunk based on a portion of the complexity data that indicates an overall complexity of the chunk relative to other chunks in the plurality of chunks. Each chunk is then encoded using an encoding rate based on the portion of the total encoding bandwidth allocated to each respective chunk. Further, two (or more) of the chunks may be are encoded in parallel. The method also includes assembling the encoded chunks to produce an encoded video.

Other embodiments include, without limitation, a computer-readable medium that includes instructions that enable a processing unit to implement one or more aspects of the disclosed methods as well as a system configured to implement one or more aspects of the disclosed methods.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIGS. 5A-5B are block diagrams illustrating a method for encoding the plurality of video chunks shown in FIG. 4, according to one embodiment of the present invention.

DETAILED DESCRIPTION

Figure 1A:
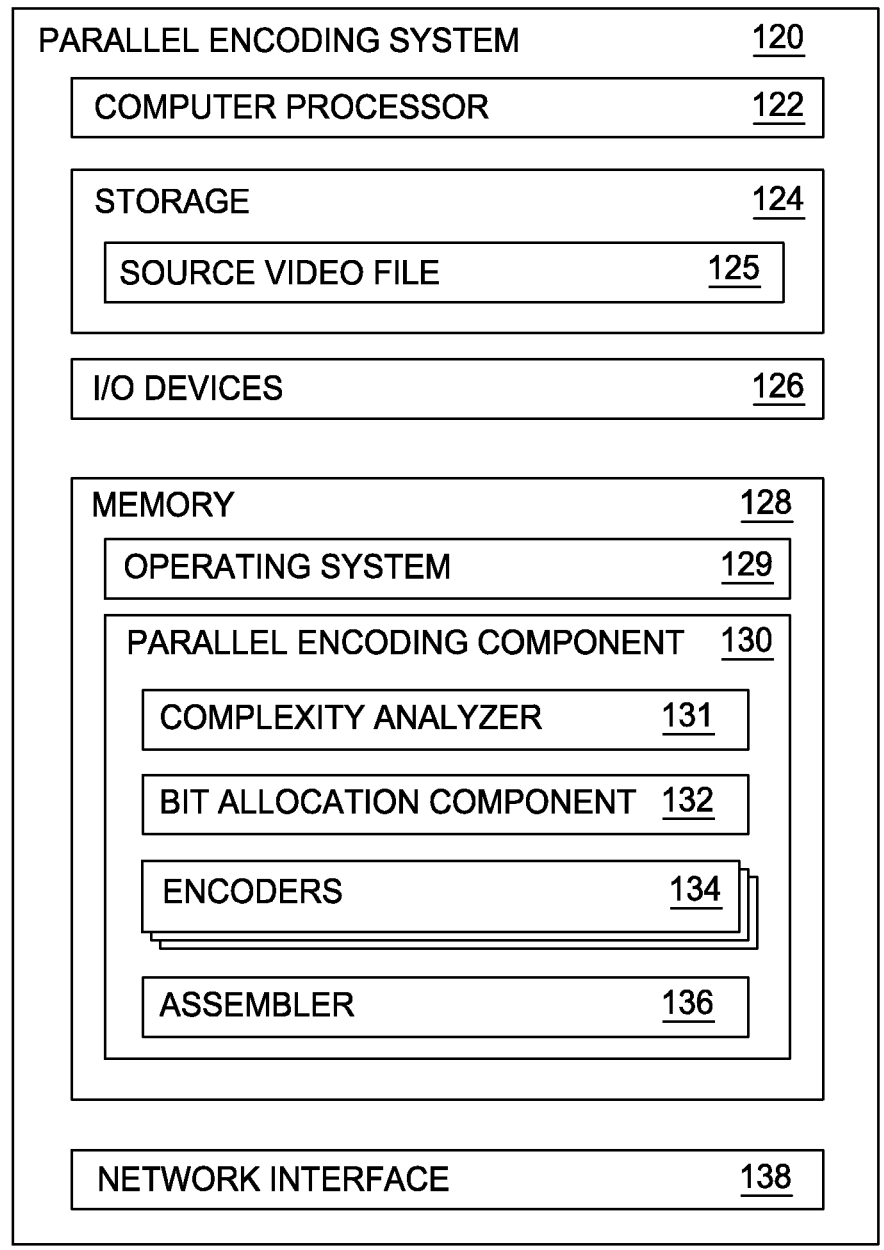
FIGS. 1A-1B illustrate computing infrastructures configured to implement one or more aspects of the present invention.

Although portions of a source video may be encoded in parallel using a plurality of encoders, such a solution may produce a lower quality encoding, since each individual encoder cannot account for the characteristics of the source video as a whole. For example, such a solution may allocate an equal amount of encoding bandwidth to each portion of the source video, and then may encode each portion in parallel using a separate encoder. However, although these encoders may account for complexities within their respective portion of the source video, the encoders cannot account for complexities across the source video as a whole. As such, such a solution may produce a lower-quality encoded video.

Embodiments of the invention provide techniques for encoding portions of a video file in parallel. More specifically, embodiments of the invention may analyze a source video to determine the complexity across scenes in the video. In context of this invention, complexity may be a measure of e.g., residual energy, or an accumulated logarithm of residual energy of macroblocks in a video frame, or a combination of logarithm of residual energy of macroblocks in a video frame and the bits necessary to encode the motion vectors and coding modes of macroblocks in a video frame, or estimates obtained by performing transform, quantization and variable length coding of residual energy using a multitude of quantization parameters that allow for parametrization of the rate needed to achieve a certain quality for each macroblock in a video frame. Note, a macroblock refers to a group of adjacent pixels (e.g., a 16×16 rectangular block) in a video frame. Embodiments of the invention may then divide the source video into a plurality of chunks and allocate a portion of an encoding bandwidth to each of the chunks. The size of the portion allocated to each chunk may be based on the complexity of the chunk, relative to other chunks in the source video. As used herein, encoding bandwidth refers to the amount of encoding data that may be used for a particular encoded video. Rather than simply allocating an equal amount of encoding bandwidth to each chunk, embodiments of the invention may allocate each chunk a portion of bandwidth based on a relative complexity of the chunk, such that a chunk with a high relative complexity may be encoded at a higher bitrate, and a chunk with a low relative complexity may be encoded at a lower bitrate. By allocating the encoding bandwidth based on relative complexity, embodiments may produce a higher-quality encoded video.

Once the encoding bandwidth is allocated, embodiments may encode each of the chunks at a rate based on the determined complexity of one or more scenes associated with the chunk. As used herein, a chunk refers to one or more frames of the video. For example, embodiments may divide a video file including two scenes into four chunks, and then encode each of the four chunks at a rate based on the complexity of the corresponding scene. Embodiments may then reassemble the encoded chunks to produce an encoded video. By encoding each chunk of the source video at a rate based on the complexity data across the source video as a whole, embodiments may produce a higher quality encoded video by accounting for complexities across the entire source video, rather than only the internal complexities within a given chunk.

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Further, particular embodiments of the invention are described using an example of a networked application used to stream media stream movies over a data communications network to end-user client devices. However, it should be understood that embodiments of the invention may be adapted more generally for the parallel encoding of any video files. Accordingly, references to a streaming media service are merely illustrative and not limiting.

FIG. 1A illustrates a computing infrastructure configured to implement one or more aspects of the present invention. As shown, the system 120 includes a computer processor 122, storage media 124, memory 128 and a network interface 138. Computer processor 122 may be any processor capable of performing the functions described herein. Storage media 124 contains a source video file 125. The source video file 125 represents any video file capable of being encoded. Furthermore, although the source video file 125 is shown in storage 124, such a depiction is for illustrative purposes only, and of course the source video 125 may be located in many different locations. For example, the source video file 125 may be located in another part of the system 120 (e.g., in memory 128), or may be located on an external computer system or device. The parallel encoding system 120 may connect to a network using the network interface 138. Furthermore, as will be understood by one of ordinary skill in the art, any computer system capable of performing the functions described herein may be used.

Additionally, the term "computer-readable storage media" as used herein refers to any media that store data and/or instructions that cause a machine to operation in a specific fashion. Computer-readable storage media may comprise non-volatile media and/or volatile media. Non-volatile media includes, for example, optical or magnetic disks, as represented by storage 124. Volatile media includes dynamic memory, such as system memory 128. Common forms of computer-readable storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, or any other memory chip or cartridge.

Computer-readable storage media is distinct from but may be used in conjunction with transmission media. Transmission media participates in transferring information between storage media. For example, transmission media includes coaxial cables, copper wire and fiber optics. Transmission media can also take the form of acoustic or light waves, such as those generated during radio-wave and infra-red data communications.

Network interface 138 typically provides data communication through one or more networks to other data devices. For example, network interface 138 may provide a connection through a local network to a host computer or to data equipment operated by an Internet Service Provider (ISP). An ISP in turn provides data communication services through the world wide packet data communication network now commonly referred to as the "Internet." A local network and Internet both use electrical, electromagnetic or optical signals that carry digital data streams. The signals through the various networks and the signals on network interface 138, which carry the digital data to and from the parallel encoding system 120, are example forms of transmission media.

In the pictured embodiment, memory 128 contains an operating system 129 and a parallel encoding component 130. The parallel encoding component includes a complexity analyzer 131, a bit allocation component 132, a plurality of encoders 134, and an assembler 136. Although memory 128 is shown as a single entity, memory 178 may include one or more memory devices having blocks of memory associated with physical addresses, such as random access memory (RAM), read only memory (ROM), flash memory or other types of volatile and/or non-volatile memory. The operating system 129 may be any operating system capable of performing the functions described herein.

In one embodiment, the complexity analyzer 131 may analyze the source video file 125 to determine the complexity at a plurality of sampling points in the video. Any collected data that is related to this complexity analysis may be generally referred to as complexity data. Generally, scenes within a source video file may differ in their complexity. For example, a first portion of a video may take place indoors and may include very little movement and detail, whereas a second portion of the video may take place outdoors and include a substantial amount of movement and details. In this example, the parallel encoding component 130 may determine that each portion represents a separate scene, and then analyze each scene to determine its complexity. Continuing this example, the complexity analyzer 131 may determine that the first scene is a relatively low complexity scene, whereas the second scene is a relatively high complexity scene. In one embodiment, the parallel encoding component 130 may sample the source video file in equal-sized intervals.

Additionally, the complexity analyzer 131 may measure the complexity of a scene in terms of the residual energy of the scene. Generally, one method many video encoders use to achieve compression is to represent certain frames of the encoded video using only the changes (in pixels or groups of pixels) from the previous frame. Accordingly, the encoder only needs to encode these changes to represent the second frame which is also commonly referred to as residue. For a series of frames where very few areas of the screen are changing, the encoder only needs to encode a small amount of residue across the series of frames (i.e., the scene has a low residual energy) and so a low bitrate encoding may suffice. In contrast, for a series of frames where many areas of the screen are changing, the encoder may need to encode a large amount of residue across the series of frames (i.e., the scene has a high residual energy), and so a higher bitrate encoding may be required to capture all the detail of the scene.

In another embodiment, the sum of logarithm of residual energy for each macroblock in a video frame can be used as a measure of complexity of a certain video frame. In yet another embodiment, the combination of the sum of logarithm of residual energy for each macroblock in a video frame with the number of bits necessary to encode the motion vectors and coding modes for each macroblock in a video frame can be used to calculate the complexity of a frame. In yet another embodiment, the complexity analyzer 131 may perform the steps of calculating the residual energy and subsequent block transform, as prescribed by the video coding standard in use. For example, the MPEG1, MPEG2 and MPEG4 video standard use the 8×8 Discrete Cosine Transform (DCT), the H.264 video standard uses a 4×4 integer block transform (and, optionally, a second, 8×8 integer block transform), while the VC1 standard uses an 8×8 block transform.

After obtaining the transform coefficients, the complexity analyzer 131 may perform multiple steps of quantization by using a multitude of quantization parameter values. For example, the complexity analyzer 131 can use 2 quantization parameters, which for the case of H.264 can take the value 17 and 34. Note that the values used need to span the range of allowable quantization parameter values and they should advantageously cover the range of values uniformly. For example, in case of H.264 video coding standard, where the range of values for the quantization parameter is 0 to 51, the values 17 and 34 provide an almost equidistant partition of the range in 3 subintervals, namely [0,17], [18,34], [35,51]. The 2 sets of quantized transform coefficients are subsequently encoded using the variable length tables provided by the coding standard, and thus obtain the number of bits needed to encode a certain macroblock for a set of quantization parameter values. The pairs of quantization values and bit counts form a so-called rate-distortion curve that can be approximated by a number of well-known closed-form functions, such a second-order polynomial, or an exponential curve. This curve allows the complexity analyzer 131 to predict with high degree of accuracy the required number of bits to achieve a certain video quality level.

Once the complexity analyzer 131 processes the source video file 125, the parallel encoding component 130 divides the source video file 125 into a plurality of chunks 125. In one embodiment, the number of chunks in the plurality of chunks is based on the length of the source video file 125. In another embodiment, the number of chunks is based on a number of available encoders 134 in the system 120. The bit allocation component 132 then determines an encoding rate at which to encode each chunk of the source video, based on the complexity data determined relative to the title as a whole. Generally, the more complex a particular chunk is (or the more complex a scene associated with the chunk is), relative to other chunks in the title, the higher the rate at which that chunk should be encoded, so as to capture more details of the scene. That is, the most complex series of frames within an individual chunk may be relatively simple compared to other chunks in the title. As such, by encoding the chunks at a bitrate based on the complexity across the source video as a whole, embodiments of the invention may produce a higher-quality encoded video.

Additionally, both the terms scene and chunk are defined herein as representing one or more frames of a video. As an example, a particular chunk and a particular scene in a source video may be the same. However, this is not always the case. For instance, a particular scene may be divided into multiple chunks. Conversely, a particular chunk may span two or more scenes. Thus, although the terms scene and chunk are defined similarly, the terms may be used differently in describing embodiments of the invention. Furthermore, although a particular source video may be sampled at a particular interval, the chunk size that video is divided into may be but is not necessary the same size as the interval.

The plurality of encoders 134 may then encode each of the chunks of the source video file 125 in parallel and at the determined encoding rate. Generally, the chunks may be encoded using video codec capable of encoding a video file at a particular encoding rate. Exemplary video codecs include, without limitation, MPEG-1, MPEG-2, MPEG-4 ASP, MPEG-4v3, AVI and WMV. Regardless of the codec used, once the chunks are encoded, the assembler 136 may then merge the encoded chunks to produce an encoded video file. In one embodiment of the invention, the assembler 136 may also modify metadata associated with each chunk to reflect the merge operation. For example, the assembler 136 may update a header portion of a chunk to reflect an updated length of the encoded video file.

Advantageously, by encoding the chunks at rates dependent upon the complexity of the chunk determined relative to other chunks in the source video, embodiments of the invention may produce a higher-quality encoded video by more efficiently encoding the source video file 125, as compared to encoding all the chunks at an equal rate. That is, because high complexity scenes may be encoded at a higher rate than low complexity scenes, embodiments of the invention may capture more details of the high complexity scenes, and offset this by saving space when encoding the low complexity scenes, the quality of which does not diminish substantially from a lower bitrate encoding. Embodiments of the invention may account for these variations in the complexity between the chunks, and may encode each chunk at an appropriate bitrate based on its complexity relative to the other chunks of the source video as a whole.

Figure 1B:
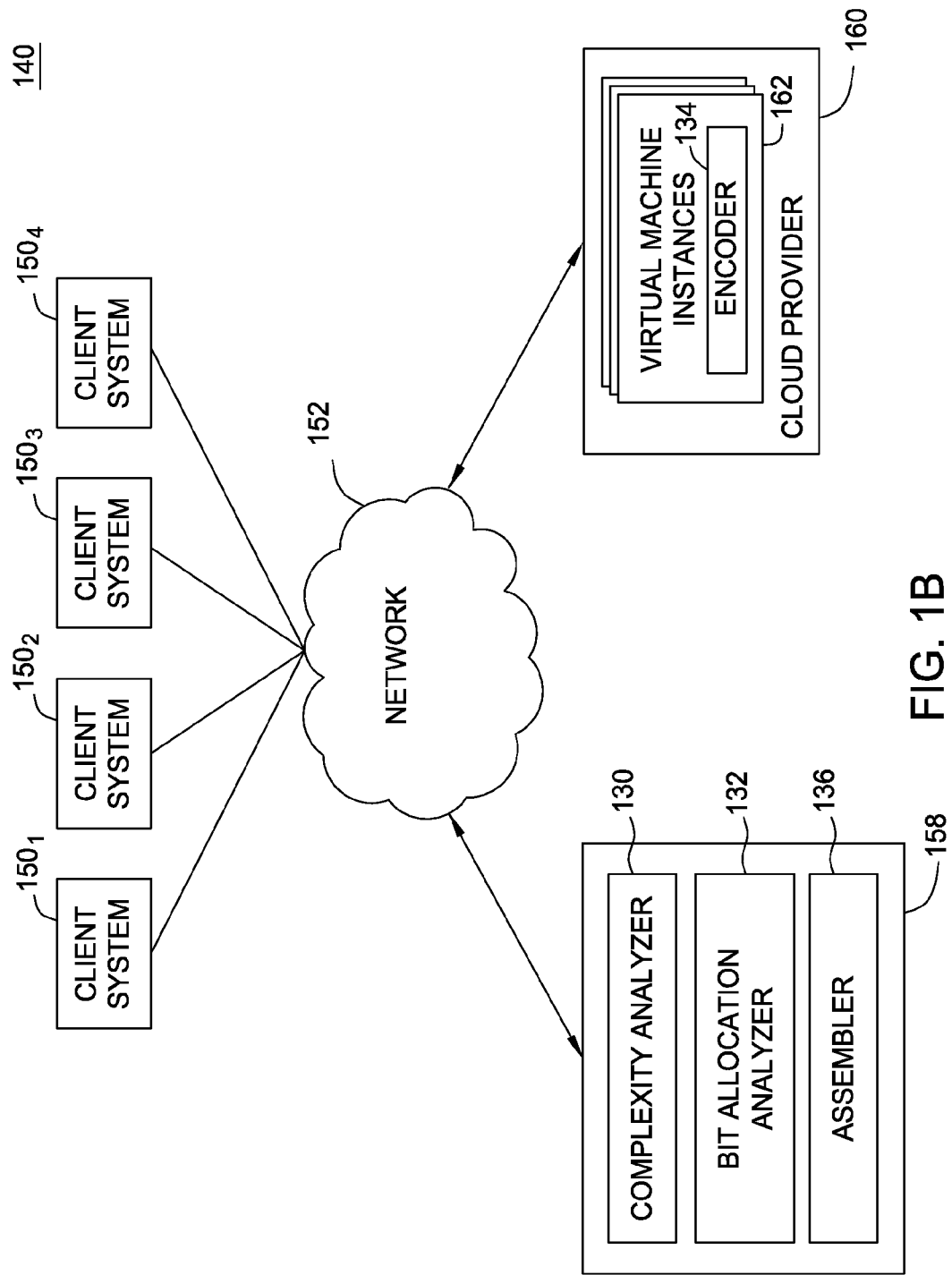

FIG. 1B illustrates a computing infrastructure configured to implement one or more aspects of the present invention. As shown, the infrastructure 140 contains a plurality of client systems 150, a complexity analysis system 158 and a cloud provider 160. Generally, the client systems 150 may request streaming video content from the system 158, and upon receiving such a request, the system may begin streaming the requested content to the client system 150. Furthermore, as discussed above, embodiments of the invention may encode chunks of a source video file in parallel using a plurality of encoders. In one embodiment of the invention, the plurality of encoders may execute within a cloud hosted by the cloud provider 160.

Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g., an amount of storage space consumed by a user or a number of virtual machine instances spawned by the user). A user can access any of the resources that reside in the cloud at any time and from anywhere. Once provisioned, a virtual machine instance 162 provides an abstraction of a computing server, and a user can generally install and execute applications on the virtual machine instance 162 in the same manner as thought they controlled the physical computing server represented by the virtual machine instance 162.

Embodiments of the invention may be used to encode portions of a video file in parallel using a plurality of encoders 134 running on virtual machine instances 162 deployed using a cloud computing infrastructure made available by cloud provider 160. More specifically, a plurality of encoders 134 may be deployed across the virtual machine instances 162. The parallel encoding component 130 may then divide the source video file 125 into a plurality of chunks, and encode each chunk of the video in parallel using the encoders 134, in the same manner as accessing the encoders locally on the system 120. At the same time, the video provider can rapidly scale the number of encoders 134 simply by spawning additional virtual machine instances 162. This allows the provider to divide the video file 125 into a higher number of chunks as needed (e.g., for an exceptional lengthy video file). Additionally, the provider may increase the number of video files 125 that may be encoded at once by scaling up the number of encoders 134. The cloud provider 160 may provide an auto scaling feature used to automatically scale up or down the number of virtual machine instances 162 allocated to a given application (or application component) based on its needs at any given time. Because the complexity analysis is performed relative to the title as a whole, as opposed to across an individual chunk, the number of instances used to encode the chunks is simply a matter of determining how many instances are needed, and allocating an appropriate amount of encoding bandwidth to the encoders assigned to a given chunk (or chunks). Additionally, while the complexity analysis system 158 is shown outside of the computing cloud of virtual machine instances 162, the complexity analysis system 158 may itself be running a virtual machine instance 162 spawned in the computing cloud.

Advantageously, embodiments of the invention result in increased video encoding performance by encoding portions of a single video file in parallel. That is, by encoding multiple chunks of a video file in parallel using a plurality of encoders 134 executing on virtual machine instances 162 in a cloud, embodiments may encode a video file more quickly than a linear, non-parallelized approach. Furthermore, by encoding the chunks at bitrates based on associated complexity data, embodiments may produce a high-quality encoding, where the more complex scenes are encoded at a higher bitrate than less complex scenes. As a result, content servers using embodiments of the invention may more quickly encode source videos and produce higher-quality encoded video files for streaming.

Figure 2:
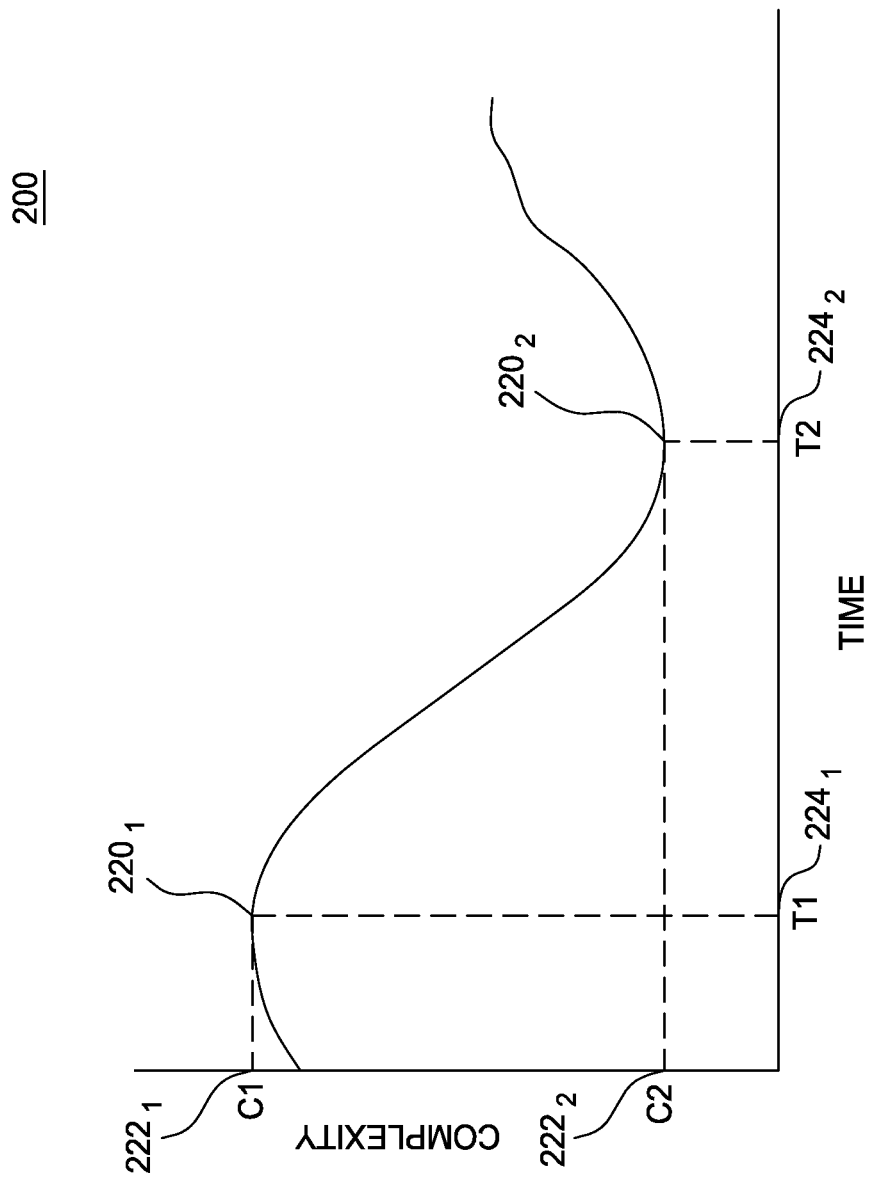
FIG. 2 illustrates a complexity graph for a source video, according to one embodiment of the present invention.

FIG. 2 illustrates a complexity graph for a source video, according to one embodiment of the present invention. More specifically, the graph 200 shows complexity measurements over time for a source video file 125. As shown, the graph 200 includes a first point $220_1$, which has a complexity value C1 $222_1$ and a time value T1 $224_1$. The graph 200 also includes a second point $220_2$, with a complexity value C2 $222_2$ and a time value T2 $224_2$. For purposes of this example, assume the first point $220_1$ represents a high-complexity movie studio logo animation including many detailed textures and movements, while the second point $220_2$ represents a low-complexity Motion Picture Association of America (MPAA) rating screen including only text and very limited movements. Additionally, assume the first point $220_1$ corresponds to a first chunk of the video file, and the second point $220_2$ corresponds to a second chunk of the video file.

In this example, the bit allocation component 132 may determine the first chunk should be encoded at a higher bitrate than the second chunk, based on the corresponding complexity data for each of the chunks. Thus, embodiments may capture more of the details in the first chunk by encoding it at a higher bitrate, resulting in an improved encoded video file, and may conserve space by encoding the second chunk at a lower bitrate, which, due to the low complexity of the second scene (as shown by point $220_2$), may result in little to no quality degradation for that chunk of the video.

Figure 3:
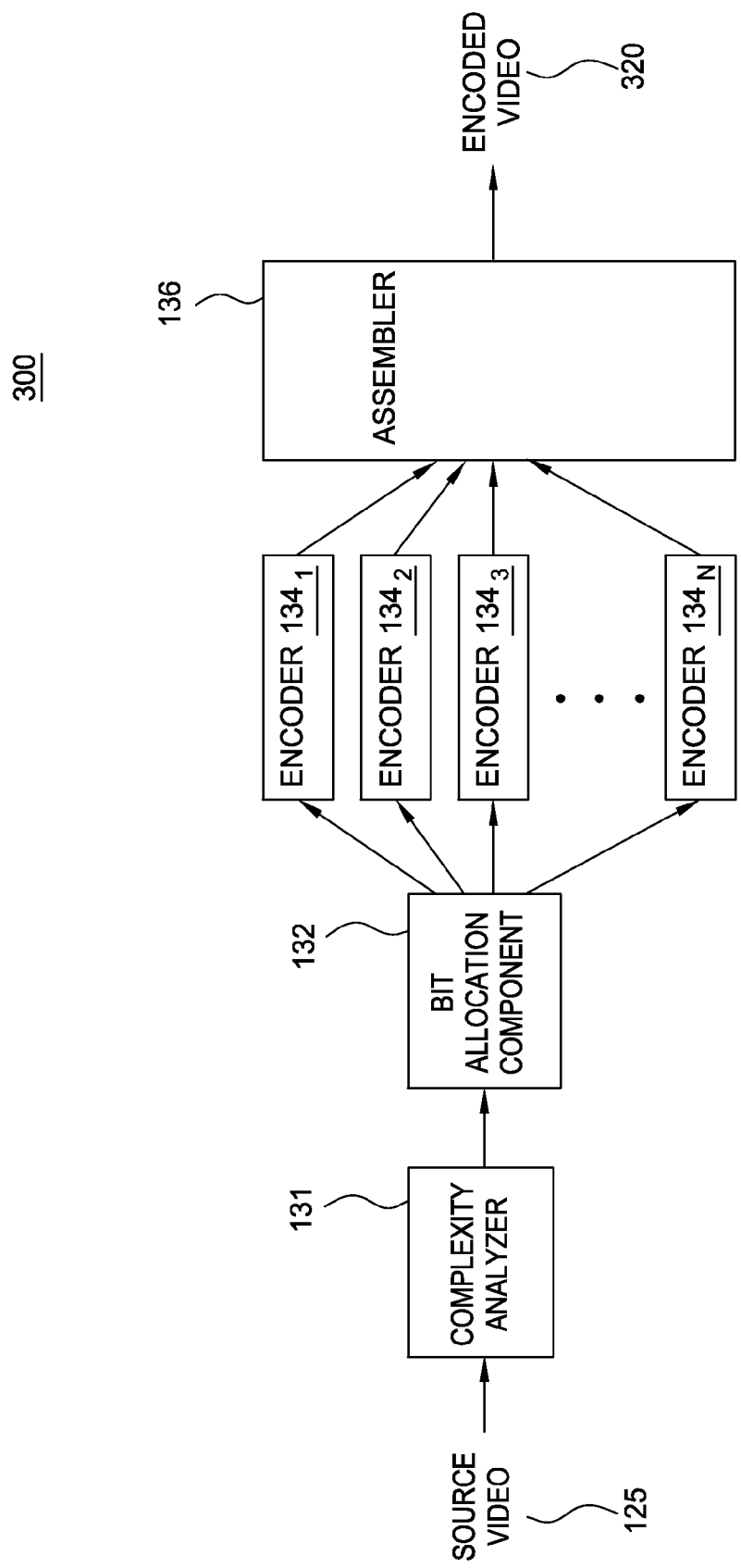
FIG. 3 is a block diagram illustrating a system for encoding video, according to one embodiment of the present invention.

FIG. 3 is a block diagram illustrating a system for encoding video, according to one embodiment of the present invention. More specifically, the system 300 shows a pipelined method for encoding a source video file 125 in parallel. In the depicted embodiment, the source video file 125 is first processed by the complexity analyzer 131. As discussed above, the complexity analyzer 131 generally determines a measure of complexity for different scenes of the source video file 125. In one embodiment, the complexity analyzer 131 measures the complexity of a scene by determining the residual energy of the scene. In another embodiment, the complexity analyzer 131 measures the expected number of bits necessary to encode a scene at constant quality, e.g., by accumulating the base-2 logarithm of the residual energy of each macroblock in a video frame. That is, the operation of taking the logarithm (and then summing) for each macroblock may be used to obtain a complexity measure for a frame. Similarly, the operation of taking a weighted average (e.g., 80%) of the previous sum of logarithms and a number of bits need to encode motion vectors and coding modes (also obtained by the complexity analyzer) may be used to provide a complexity measure.

In another embodiment, multiple quantization parameter (QP) pseudo-encoding (i.e., counting the bits needs for each QP but not producing the corresponding file) may be performed and a rate-distortion curve may be obtained. Such a rate distortion curve may estimate a measure of distortion expected at different bit rates. Once obtained, bit rate allocations may be made based on the rate distortion curve. More generally, once the complexity analyzer 131 processes the source video 125, the bit allocation component 132 determines an encoding bitrate for each chunk of the source video file 125.

Once the encoding rates for each chunk are determined, the chunks are encoded by the encoders $134_{1-N}$, at the corresponding encoding rates. As discussed above, the encoders 134 may execute on a single computer system (e.g., system 120). In another embodiment, the encoders may execute on one or more virtual machine instances 162 within a cloud. Of course, one of ordinary skill in the art will quickly realize that these examples are for illustrative purposes only, and that the encoders 134 may execute on any system or combination of systems capable of performing the functions described herein.

Once the chunks are encoded using the encoders $134_{1-N}$, the encoded chunks are processed by the assembler 136 to produce an encoded video file 320. Generally, the encoded chunks will be assembled in the same order they were originally in. For example, the first chunk of the video file 125 may be the first encoded chunk of the encoded video file 320. Additionally, the assembler 136 may also modify metadata associated with the encoded chunks as part of the assembly process. That is, since each chunk was encoded as a separate video segment, the encoded chunks may contain metadata (e.g., header information) specifying data specified to the single encoded segment. As such, the assembler 136 may modify or remove this metadata when combining the encoded chunks to create the single encoded video file.

Figure 4:
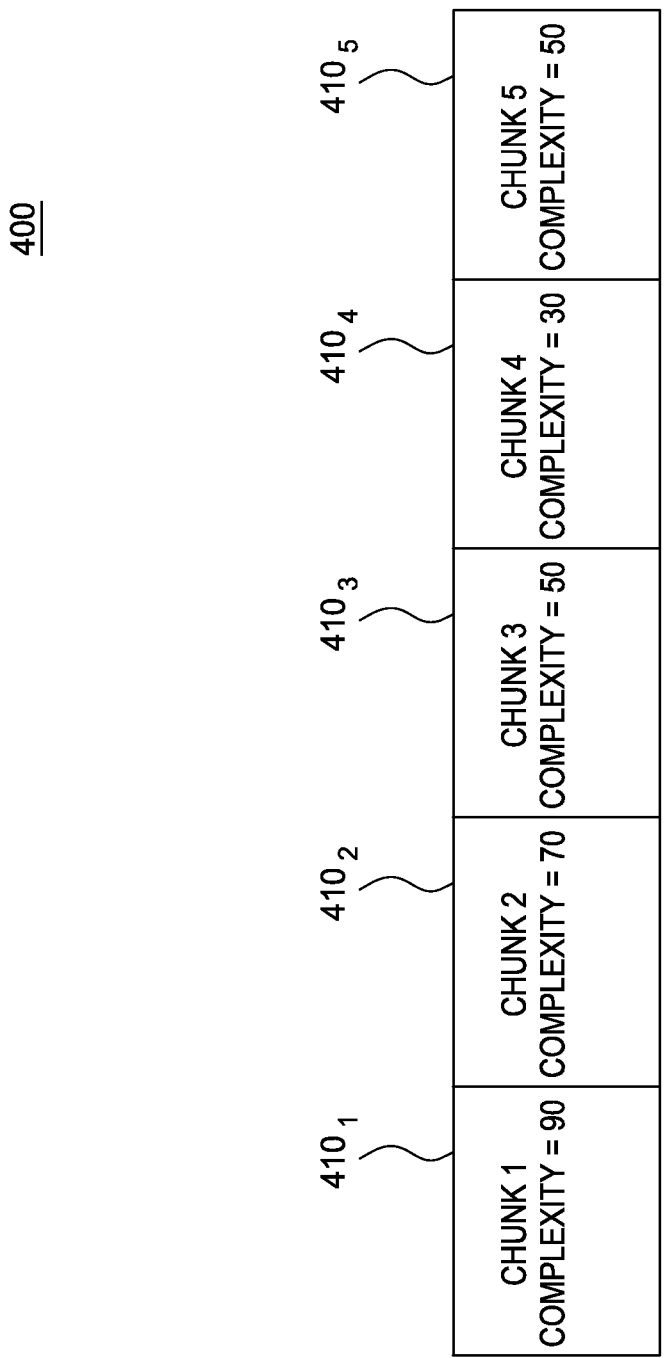
FIG. 4 illustrates an exemplary video divided into a plurality of video chunks, according to one embodiment of the present invention.

FIG. 4 illustrates an exemplary video title divided into a plurality of video chunks, according to one embodiment of the present invention. As shown, a video 400 is divided into five different chunks $410_{1-5}$. Additionally, the complexity analyzer 131 has calculated a complexity value associated with each chunk 410. For purposes of this example, assume the complexity analyzer 131 represents the complexity of a scene using a value from 1 to 100, where 1 is the least amount of complexity and 100 the greatest amount of complexity. For example, chunk 1 $410_1$ represents a very complex scene of the video and has a complexity of 90, whereas chunk 4 $410_4$ represents a less complex scene and has a complexity value of 30. As noted above, the complexity of a chunk is determined relative to the scene as a whole, rather than relative to the internal complexity of a given chuck. That is, while a portion of a given chunk may have what looks like a peak of complexity relative to other portions within that chunk, when viewed relative to the all the chunks as a whole, the portion may not be very complex at all. The exemplary video 400 shown in FIG. 4 is discussed in more detail below in the discussion of FIGS. 5A-5B.

Figure 5A:
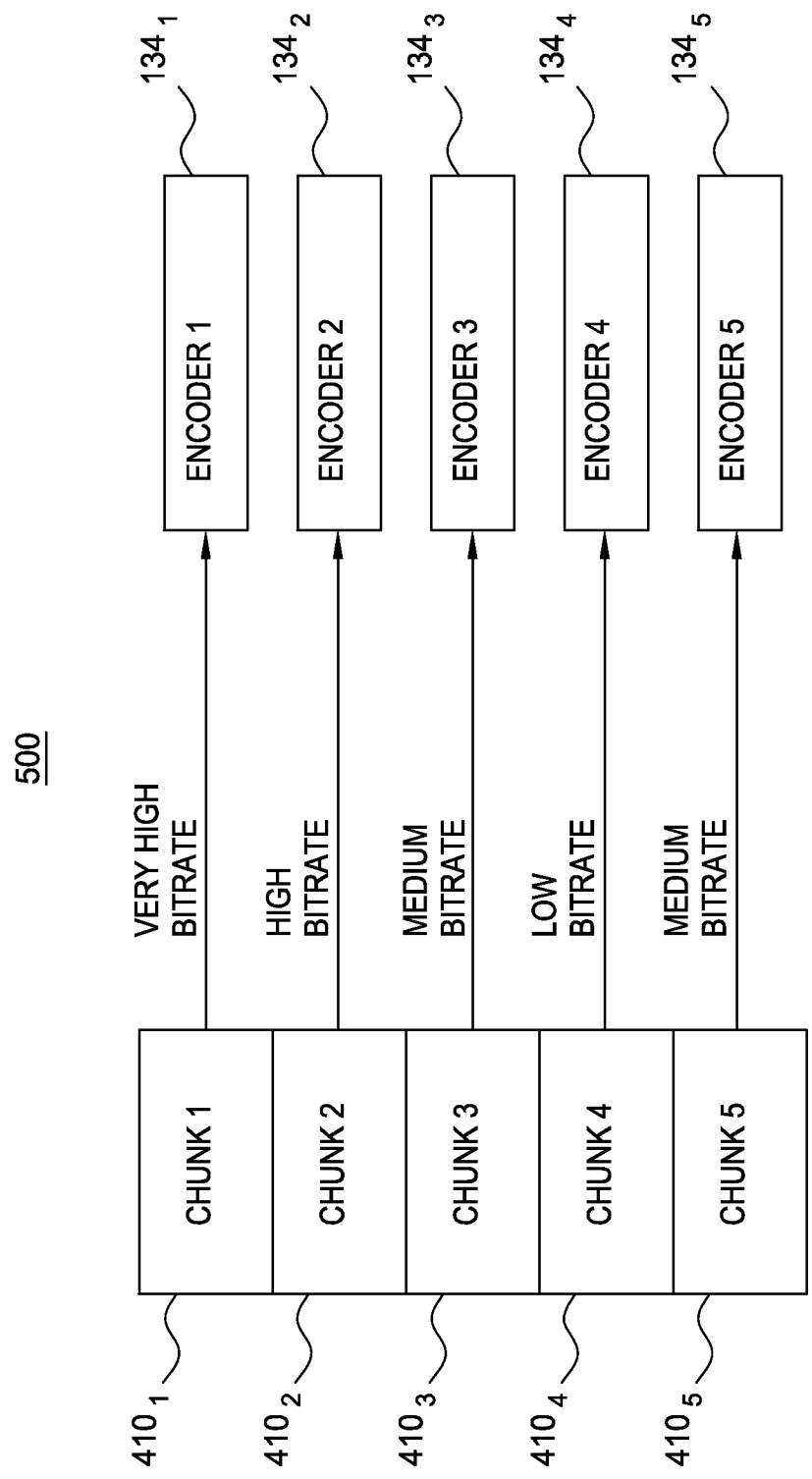

FIGS. 5A-5B are block diagrams illustrating methods for encoding the plurality of video chunks shown in FIG. 4, according to one embodiment of the present invention. As shown in FIG. 5A, the diagram 500 illustrates the chunks 410 of the source video file 400. As shown, each chunk 410 is encoded at a corresponding bitrate using a different encoder 134. For example, chunk 1 $410_1$, the chunk with the highest complexity value in the video (i.e., a complexity value of 90), is encoded using encoder 1 $134_1$ at a very high bitrate. That is, of the available encoding bandwidth, the first chuck is allocated a larger amount of bits, relative to other chunks. Likewise, chunk 4 $410_4$, the chunk with the least amount of complexity in the video (i.e., a complexity value f 30), is encoded using encoder 4 $134_4$ at a low bitrate. By encoding the chunks at varying bitrates based upon their relative complexity, embodiments of the invention may produce a higher quality encoded video by capturing more details in the most complex scenes of the video by using a higher bitrate for encoding those. Likewise, by encoding all of the chunks in parallel, embodiments may achieve increased performance over non-parallelized video encoding.

FIG. 5B is a block diagram illustrating a method for encoding the plurality of video chunks shown in FIG. 4, according to one embodiment of the present invention. As shown, the diagram 540 illustrates the chunks 410 of the source video file 400. In the depicted example, a portion 560 of the video file is encoded at a corresponding bitrate using a different encoder 134. Each block contains a chunk 410 of the video file to be encoded, as well as one or more adjacent chunks 564. As used herein, an adjacent chunk refers to any chunk in proximity to a particular chunk of a video file (including chunks with multiple degrees of separation to the particular chunk), and may either precede or follow the particular chunk in the video file. For example, the block $560_1$ contains chunk 1 $410_1$, which is the chunk to be encoded, as well as the adjacent (i.e., subsequent) chunk 2 $564_1$. As a second example, the block $560_4$ contains chunk 4 $410_1$, which is the chunk to be encoded, and also contains the adjacent (i.e., proceeding) chunk 3 $564_6$ and adjacent (i.e., subsequent) chunk 5 $564_7$.

By providing the adjacent chunks 564 to the encoder 134 in addition to the chunk 410 to be encoded, embodiments of the invention may produce higher quality encoded chunks, as the encoders 134 may sample data from the adjacent chunks as part of the encoding process. For example, if only a single chunk is sent to an encoder 134 for encoding, the encoder 134 has no way of knowing what frames precede or follow the chunk. However, when one or more adjacent chunks are also provided, the encoder 134 may sample data from these adjacent chunks, such that the first frame of the chunk to be encoded may smoothly transition from the previous adjacent chunk, and the last frame of the chunk to be encoded may smoothly transition to the subsequent adjacent chunk. As a result, by providing adjacent chunks to the encoder, embodiments may improve the quality of the encoded video. Furthermore, in one embodiment of the invention, the encoder 134 may encode the entire block 560 of the video, and then discard any portions associated with the adjacent chunks. For example, encoder 1 $134_1$ may encoder the entire block $560_1$ to produce an encoded block, and may then discard the portion of the encoded block relating to adjacent chunk 2 $564_1$.

Additionally, although for the depicted embodiment the adjacent chunks 564 are immediately adjacent to the chunk to be encoded, this is for illustrative purposes only and of course adjacent chunks with multiple degrees of separation may be provided as well. For example, in one embodiment of the invention, up to 6 adjacent chunks may be sent to the encoder 134 for each chunk to be encoded: up to three chunks preceding the particular chunk, and up to three chunks subsequent to the particular chunk. Additionally, the number of adjacent chunks provided may be based upon the number of total chunks. For example, in an embodiment where the video file is divided into 3 chunks, it may be inefficient to provide only immediately-adjacent chunks to each encoder. However, where the video file is divided into 300 chunks, it may be efficient to provide adjacent chunks with multiple degrees of separation to the encoder.

Figure 6:
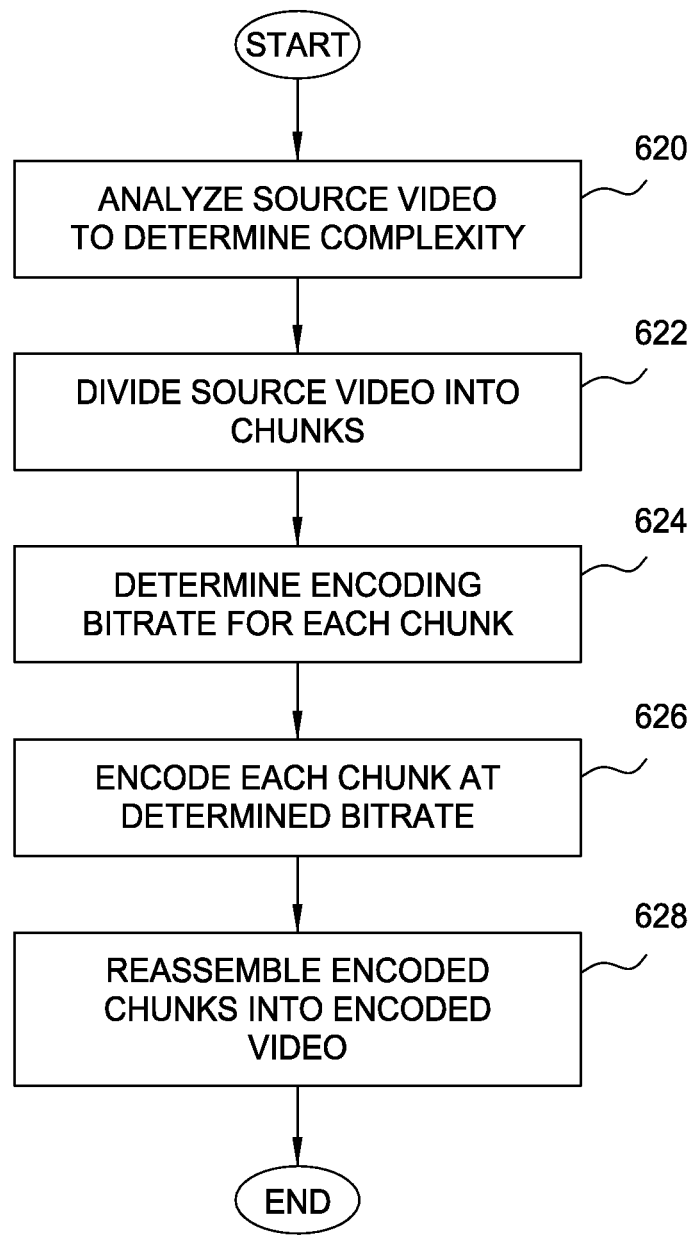
FIG. 6 is a flow diagram illustrating a method for video encoding based on complexity analysis, according to one embodiment of the present invention.

FIG. 6 is a flow diagram illustrating a method for video encoding based on complexity analysis, according to one embodiment of the present invention. As shown, the method 600 begins at step 620, where the complexity analyzer 131 analyzes a source video 125 to determine a complexity at a plurality of sampling points. As discussed above, in one embodiment of the invention, the complexity analyzer 131 determines the complexity of a scene by determining the residual energy at each of the sampling points. By doing so, embodiments determine a relative measure of scene complexity from chunk-to-chunk. However, more generally, any indicia of or relating to the complexity of a sampling point may be used. Additionally, according to embodiments of the invention, more than one measurement of complexity may be used together, along with various weights for each measurement, to determine the overall complexity of a particular sampling point.

Once the complexity of each scene is determined, the parallel encoding component 130 divides the source video 125 into a plurality of chunks (step 622). In one embodiment of the invention, the source video 125 is divided into a plurality of equal-sized chunks. Additionally, the size of each chunk may be a predetermined amount or may be a derived value. As a first example, the parallel encoding component 130 may be configured to always divide source video files into chunks that are 50 frames in length. As a second example, the component 130 may divide a particular source video file into a number of chunks based on a number of currently available encoders. Of course, these examples are for illustrative purposes only, and one of ordinary skill in the art will quickly recognize that the number of chunks and the size of the chunks may be derived from any number of other factors.

In one embodiment, the chunks are of varying sizes, based on a scene analysis of the source video 125. For example, assume the parallel encoding component 130 determines that an exemplary source video 125 includes two scenes: a first scene lasting 11 seconds, and a second scene lasting 10 seconds. Further assume that the parallel encoding component 130 is configured to divide the video 125 into 4 chunks. In this example, in order to restrict each chunk to a portion of a single scene, the component 130 may divide the first scene using two chunks of sizes 5 seconds and 6 seconds, and the second scene with two 5 second chunks. In one embodiment of the invention, the number of chunks used is based on the length of the source video 125. For example, the parallel encoding component 130 may divide a 2 hour video file into 120 different 1 minute chunks, but may divide a 2 minute video file using fewer chunks.

The bit allocation component 132 then determines an encoding bitrate for each of the chunks (step 624). For example, the bit allocation component 132 may determine a high complexity chunk should be encoded at a high bitrate, and vice versa. Additionally, as discussed above, the bit allocation component 132 determines the complexity of each chunk relative to the other chunks of the title. Accordingly, the bit allocation component 132 may also allocate encoding bandwidth (i.e., in terms of the bitrate the chunks are encoded at) across the chunks and relative to the other chunks of the title. Once the encoding rates are determined, the chunks are encoded at the determined rates in parallel using the encoders 134 (step 626).

As discussed above, at least one chunk adjacent to the chunk to be encoded may be provided to each encoder 134 as well. Additionally, the encoders 134 may all execute within a single computer system or may execute across multiple computer systems. Furthermore, in one embodiment of the invention, at least one encoder in the plurality of encoders 134 executes on a virtual machine within a computing cloud. The encoded chunks are then assembled by the assembler 138 to produce an encoded video file (step 628). Once the encoded chunks are assembled, the method 600 ends.

Advantageously, the method 600 encodes videos more efficiently by encoding multiple chunks of a video file in parallel across a plurality of encoders 134. Furthermore, by encoding each of the chunks at an encoding bitrate determined based upon complexity data associated with the chunk and determined relative to the other chunks in the video file, embodiments may produce a higher-quality encoded video than techniques that use a constant encoding bitrate across all the chunks. That is, by accounting for complexities across multiple chunks, embodiments produce a higher quality video encoding than existing parallel encoding solutions. Additionally, by providing adjacent chunks to the encoders 134, in addition to the chunk to be encoded, embodiments may further improve the quality of the encoded video.

While the foregoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention.

Therefore, the scope of the present invention is determined by the claims that follow.

What is claimed is:

1. A computer-implemented method for encoding, in parallel, chunks of a source video file, the method comprising:
generating complexity data for the source video file, wherein the complexity data reflects the complexity across the source video file and includes a complexity for each sampling point in a plurality of sampling points;
dividing the source video file into a plurality of chunks, wherein each chunk represents a portion of the source video file;
determining a complexity value associated with each chunk in the plurality of chunks based on a predetermined range of complexity values;
for at least a first chunk in the plurality of chunks:
allocating a respective portion of a total encoding bandwidth to the chunk based on the complexity value associated with the chunk indicating an overall complexity of the chunk relative to every other chunk in the plurality of chunks including at least one chunk that is subsequent to the first chunk in the plurality of chunks;
determining a respective encoding rate for the chunk based on the portion of the total encoding bandwidth allocated to the chunk; and
encoding the chunk at the determined encoding rate; and assembling a plurality of encoded chunks to produce at least a portion of an encoded video.

2. The method of claim 1, wherein the complexity data comprises residual energy data indicating the residual energy at each sampling point in the plurality of sampling points.

3. The method of claim 1, wherein the complexity data comprises an accumulated logarithm of residual energy of each macroblock of a video frame at each sampling point in the plurality of sampling points.

4. The method of claim 1, wherein the complexity data comprises a combination of a logarithm of residual energy of each macroblock of a video frame and a number of bits needed to encode additional macroblock information at each sampling point in the plurality of sampling points, wherein the additional macroblock information includes at least one of motion vectors and macroblock modes.

5. The method of claim 1, wherein the complexity data comprises interpolated data obtained by:
   calculating the residual energy of each macroblock of a video frame;
   performing a block transform;
   quantifying one or more transform coefficients with a plurality of quantization parameters; and
   counting the number of bits necessary to encode the resulting quantized coefficients.

6. The method of claim 5, wherein the block transform is one of a Discrete Cosine Transform, a 4×4 integer transform, and an 8×8 integer transform.

7. The method of claim 5, wherein the quantization parameters are used to produce a rate-distortion curve, and wherein the rate-distortion curve is used to predict a number of bits needed to encode a given macroblock at two or more distinct bitrates.

8. The method of claim 1, wherein the step of encoding the first chunk is further based on at least one of a previous chunk and the subsequent chunk.

9. The method of claim 1, wherein more-complex chunks are encoded at a higher encoding rate, and less-complex chunks are encoded at a lower encoding rate.

10. The method of claim 1, wherein the step of assembling the plurality of encoded chunks to produce the at least a portion of the encoded video includes modifying metadata in a header portion of at least one of the encoded chunks.

11. A non-transitory computer-readable medium containing a program that, when executed, performs an operation for encoding, in parallel, chunks of a source video file, the operation comprising:
   generating complexity data for the source video file, wherein the complexity data reflects the complexity across the source video file and includes a complexity for each sampling point in a plurality of sampling points;
   dividing the source video file into a plurality of chunks, wherein each chunk represents a portion of the source video file;
   determining a complexity value associated with each chunk in the plurality of chunks based on a predetermined range of complexity values;
   for at least a first chunk in the plurality of chunks:
      allocating a respective portion of a total encoding bandwidth to the chunk based on the complexity value associated with the chunk indicating an overall complexity of the chunk relative to every other chunk in the plurality of chunks including at least one chunk that is subsequent to the first chunk in the plurality of chunks;
      determining a respective encoding rate for the chunk based on the portion of the total encoding bandwidth allocated to the chunk; and
      encoding the chunk at the determined encoding rate; and
   assembling a plurality of encoded chunks to produce at least a portion of an encoded video.

12. The non-transitory computer-readable medium of claim 11, wherein the complexity data comprises residual energy data indicating the residual energy at each sampling point in the plurality of sampling points.

13. The non-transitory computer-readable medium of claim 11, wherein the complexity data comprises an accumulated logarithm of residual energy of each macroblock of a video frame at each sampling point in the plurality of sampling points.

14. The non-transitory computer-readable medium of claim 11, wherein the complexity data comprises a combination of a logarithm of residual energy of each macroblock of a video frame and a number of bits needed to encode additional macroblock information at each sampling point in the plurality of sampling points, wherein the additional macroblock information includes at least one of motion vectors and macroblock modes.

15. The non-transitory computer-readable medium of claim 11, wherein the complexity data comprises interpolated data obtained by:
   calculating the residual energy of each macroblock of a video frame;
   performing a block transform;
   quantifying one or more transform coefficients with a plurality of quantization parameters; and
   counting the number of bits necessary to encode the resulting quantized coefficients.

16. The non-transitory computer-readable medium of claim 15, wherein the block transform is one of a Discrete Cosine Transform, a 4×4 integer transform, and an 8×8 integer transform.

17. The non-transitory computer-readable medium of claim 15, wherein the quantization parameters are used to produce a rate-distortion curve, and wherein the rate-distortion curve is used to predict a number of bits needed to encode a given macroblock at two or more distinct bitrates.

18. The non-transitory computer-readable medium of claim 11, wherein the step of encoding the first chunk is further based on at least one of a previous chunk and the subsequent chunk.

19. The non-transitory computer-readable medium of claim 11, wherein more-complex chunks are encoded at a higher encoding rate, and less-complex chunks are encoded at a lower encoding rate.

20. The non-transitory computer-readable medium of claim 11, wherein the step of assembling the plurality of encoded chunks to produce the at least a portion of the encoded video includes modifying metadata in a header portion of at least one of the encoded chunks.

21. A system, comprising:
   a processor; and
   a memory containing a program that, when executed on the processor, performs an operation for encoding, in parallel, chunks of a source video file, the operation comprising:
      generating complexity data for the source video file, wherein the complexity data reflects the complexity across the source video file and includes a complexity for each sampling point in a plurality of sampling points;

dividing the source video file into a plurality of chunks, wherein each chunk represents a portion of the source video file;

determining a complexity value associated with each chunk in the plurality of chunks based on a predetermined range of complexity values;

for at least a first chunk in the plurality of chunks:
  allocating a respective portion of a total encoding bandwidth to the chunk based on the complexity value associated with the chunk indicating an overall complexity of the chunk relative to every other chunk in the plurality of chunks including at least one chunk that is subsequent to the first chunk in the plurality of chunks;
  determining a respective encoding rate for the chunk based on the portion of the total encoding bandwidth allocated to the chunk;
  encoding the chunk at the determined encoding rate; and assembling a plurality of encoded chunks to produce at least a portion of an encoded video.

22. The system of claim 21, wherein the complexity data comprises residual energy data indicating the residual energy at each sampling point in the plurality of sampling points.

23. The system of claim 21, wherein the complexity data comprises an accumulated logarithm of residual energy of each macroblock of a video frame at each sampling point in the plurality of sampling points.

24. The system of claim 21, wherein the complexity data comprises a combination of a logarithm of residual energy of each macroblock of a video frame and a number of bits needed to encode additional macroblock information at each sampling point in the plurality of sampling points, wherein the additional macroblock information includes at least one of motion vectors and macroblock modes.

25. The system of claim 21, wherein the complexity data comprises interpolated data obtained by:
  calculating the residual energy of each macroblock of a video frame;
  performing a block transform;
  quantifying one or more transform coefficients with a plurality of quantization parameters; and
  counting the number of bits necessary to encode the resulting quantized coefficients.

26. The system of claim 25, wherein the block transform is one of a Discrete Cosine Transform, a 4×4 integer transform, and an 8×8 integer transform.

27. The system of claim 25, wherein the quantization parameters are used to produce a rate-distortion curve, and wherein the rate-distortion curve is used to predict a number of bits needed to encode a given macroblock at two or more distinct bitrates.

28. The system of claim 21, wherein the step of encoding the first chunk is further based on at least one of a previous chunk and the subsequent chunk.

29. The system of claim 21, wherein more-complex chunks are encoded at a higher encoding rate, and less-complex chunks are encoded at a lower encoding rate.

30. The system of claim 21, wherein the step of assembling the plurality of encoded chunks to produce the at least a portion of the encoded video includes modifying metadata in a header portion of at least one of the encoded chunks.

31. The method of claim 1, wherein the portion of the complexity data indicates an overall complexity of the chunk relative to every other chunk in the plurality of chunks further including at least one chunk that is previous to the first chunk in the plurality of chunks.

32. The method of claim 1, wherein the portion of the complexity data indicates an overall complexity of the chunk relative to every other chunk in the plurality of chunks further including a plurality of chunks that are subsequent to the first chunk and a plurality of chunks that are previous to the first chunk.

33. The method of claim 1, wherein the complexity value associated with each chunk comprises a single value based on at least two different complexity measurements.

34. The method of claim 33, wherein the complexity value associated with each chunk is further based on weights assigned to the at least two different complexity measurements.

* * * * *